Jan. 8, 1946.  N. J. RUSSELL  2,392,698
DISTINCTIVELY APPEARING ICE CREAM AND METHOD OF MAKING THE SAME
Filed March 11, 1940
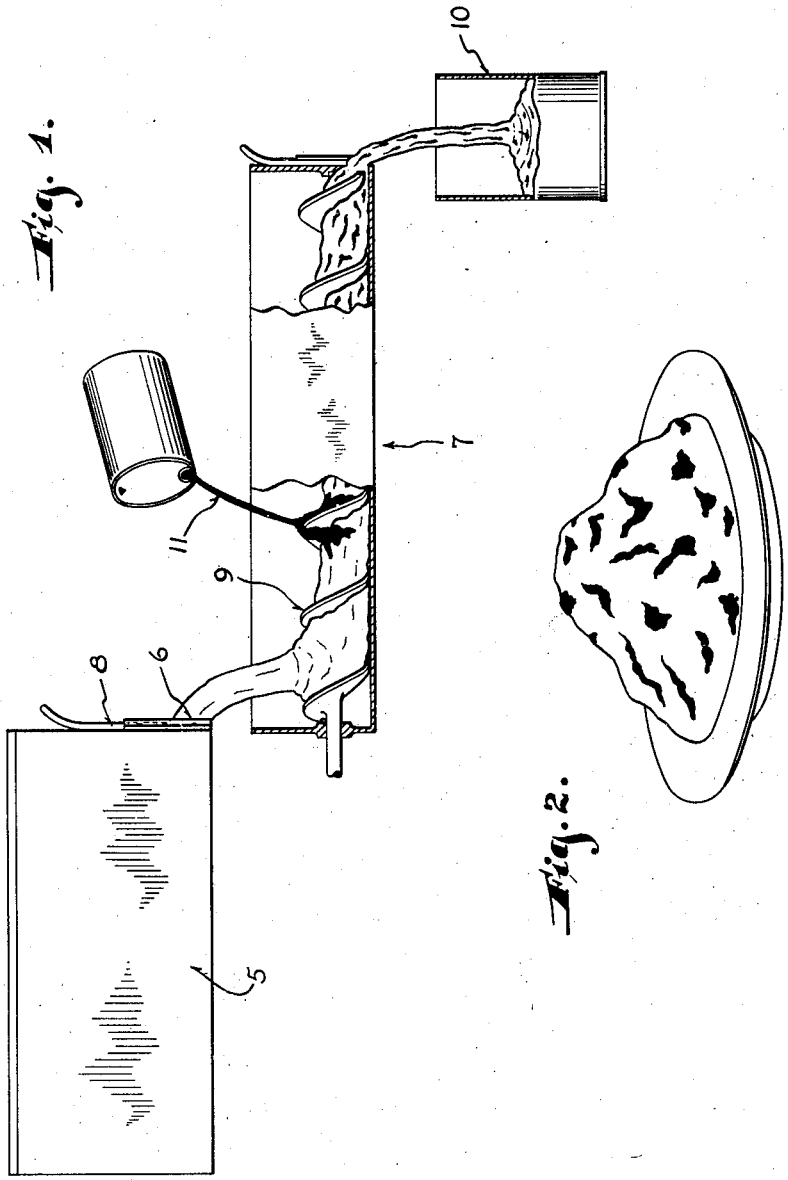
Inventor
Nevin J. Russell
By
Attorney Patented Jan. 8, 1946

2,392,698

UNITED STATES PATENT OFFICE 2,392,698

DISTINCTIVELY APPEARING ICE CREAM AND METHOD OF MAKING THE SAME

Nevin J. Russell, Wauwatosa, Wis., assignor to Robert A. Johnston Company, Milwaukee, Wis., a corporation of Wisconsin Application March 11, 1940, Serial No. 323,270

1 Claim. (Cl. 107—54)

This invention relates to the manufacture of ice cream, and more particularly to the making of ice cream with a distinctive mottled appearance.

Distinctive appearance in ice cream as well as flavor has been recognized as a valuable sales factor, but heretofore the industry has been handicapped by the fact that with present methods of packaging bulk ice cream it was impossible to combine different flavors or colors of ice cream in one container without having them run together and mix. This results from the slush-like character of the ice cream at the time of packaging.

Hence, if a retailer wished to avail himself of the sales appeal of vari-colored bulk ice cream, he was obliged to provide facilities for a large number of individual bulk ice cream containers, each containing ice cream of one color. Even then, however, little was gained as the result depended upon the artistry with which each retailer combined the various flavors and colors in the dish, cone or the like, and generally nothing but an unappetizing conglomeration of colors and conflicting flavors was produced which did not justify the additional bother.

This invention, therefore, has as one of its objects, the provision of a bulk ice cream having more than one flavor and color with the colors unmixed but harmonizing to produce a particularly distinctive mottled appearance.

Another object of this invention is to provide a practical method of making ice cream with the desired distinctive mottled appearance, by which the combining of different flavors and colors may be effected at the time of packaging the ice cream by the manufacturer.

With the above and other objects in view which will appear as the description proceeds, this invention resides in the novel process substantially as hereinafter described, and more particularly defined by the appended claim, it being understood that such changes in the precise embodiment of the hereindisclosed invention may be made as come within the scope of the claim.

The accompanying drawing illustrates one complete example of the physical embodiment of the invention constructed in accordance with the best mode so far devised for the practical application of the principles thereof, and in which:

Figure 1 is a view diagrammatically illustrating the method of making ice cream in accordance with this invention; and Figure 2 is a perspective view illustrating the distinctive appearance of ice cream made in accordance with this invention.

Referring now particularly to the diagrammatic illustration in the accompanying drawing, the numeral 5 designates a freezer in which the ice cream mix is placed and frozen in the conventional manner. After the ice cream has been frozen and while still in its slush-like or plastic state, it is discharged through an opening 6 near the bottom of the freezer into one end of a conveyor 7. A gate valve 8 may be employed to regulate the flow of freshly frozen ice cream from the freezer.

The conveyor 7, which comprises a substantially narrow open topped trough, is provided with a screw 9 disposed lengthwise therein. Upon being turned by suitable means, not shown, the screw progresses the ice cream along the trough and discharges the same into any suitable container 10.

As the ice cream is being propelled through the conveyor, a quantity of viscous fluid flavoring material 11 is added thereto. Hence, as the screw revolves it disperses the flavoring material through the ice cream without the loss of identity of either constituent. The result is a distinctive mottled appearance which is retained after discharge of the product into the containers.

While different flavoring fluids or syrups may be employed as will be readily apparent, the invention is especially adapted to the making of chocolate fudge ice cream. In this instance white vanilla ice cream is fed to the conveyor from the freezer and a chocolate flavoring known as "Cold Fudge" is poured into the conveyor as described. Cold Fudge is an ideal flavoring as it is miscible with the ice cream without loss of identity and because it congeals to the consistency of the ice cream during hardening thereof. It is to be understood that the proportions of flavoring to ice cream may be varied to produce different effects, but the quantity of flavoring generally constitutes approximately ten per cent (10%) of the manufactured product.

The procedure followed after the container 10 has been filled is the same as in conventional manufacturing methods. When the containers become full they are removed and placed in a refrigerator to solidify the ice cream and congeal the flavoring.

It is also to be appreciated that while the method described produces bulk ice cream having a mottled appearance as a result of the addition of flavoring of contrasting characteristics being dispersed throughout the body of the ice cream, this method is equally well suited for the production of brick ice cream having a like appearance. In this latter instance, it is merely necessary to discharge ice cream from the conveyor into forms of brick size and thereafter harden the same in a refrigerator.

From the foregoing description, taken in connection with the accompanying drawing, it will be readily apparent that this invention will promote the sale of ice cream due to the novel colorful mottled appearance produced by the dispersion of the flavoring material in the ice cream.

What I claim as my invention is:

The hereindescribed method of making bulk ice cream having a contrasting flavoring material irregularly dispersed therethrough without loss of identity, which comprises: continuously moving freshly frozen ice cream directly from a continuous freezer along a defined path; uninterruptedly adding a contrasting plastic flavoring material which is flowable at normal temperatures and congeals into a deformable plastic upon refrigeration, as a stream of substantial volume, to the freshly frozen ice cream as it moves along said path; directly and without hindrance discharging the combined ice cream and flavoring material into a container for commercial distribution; distributing and breaking up the regularity of the stream of flavoring material as it travels with the ice cream and before it has been congealed to form lumps of flavoring material of substantial volume dispersed throughout the ice cream without interfering with the flow of the ice cream and substantially without loss of identity of either ingredient; and subjecting the filled container to a refrigerating temperature to harden the ice cream and congeal the flavoring material to a deformable plastic consistency.

NEVIN J. RUSSELL.